(12) United States Patent
Arya et al.

(10) Patent No.: US 8,504,713 B2
(45) Date of Patent: Aug. 6, 2013

(54) ADAPTIVE PROGRESSIVE DOWNLOAD

(75) Inventors: Ashwani Arya, Encinitas, CA (US); Parag Arole, Carlsbad, CA (US)

(73) Assignee: Allot Communications Ltd., Hod-Hasharon (IL)

( * ) Notice: Subject to any disclaimer, the term of this patent is extended or adjusted under 35 U.S.C. 154(b) by 422 days.

(21) Appl. No.: 12/790,728

(22) Filed: May 28, 2010

(65) Prior Publication Data
US 2011/0296046 A1 Dec. 1, 2011

(51) Int. Cl.
*G06F 15/16* (2006.01)

(52) U.S. Cl.
USPC .......................................... 709/231; 709/232

(58) Field of Classification Search
USPC ................................................ 709/231, 232
See application file for complete search history.

(56) References Cited

U.S. PATENT DOCUMENTS

| | | | | |
|---|---|---|---|---|
| 7,860,996 B2* | 12/2010 | Musayev et al. | .............. | 709/231 |
| 7,895,629 B1* | 2/2011 | Shen et al. | ...................... | 725/62 |
| 7,925,774 B2* | 4/2011 | Zhang et al. | ................. | 709/231 |
| 7,949,775 B2* | 5/2011 | Virdi et al. | ..................... | 709/231 |
| 8,156,239 B1* | 4/2012 | Ashrafi | ......................... | 709/231 |
| 8,239,560 B2* | 8/2012 | Lee et al. | ....................... | 709/231 |
| 2002/0052967 A1* | 5/2002 | Goldhor et al. | ............... | 709/231 |
| 2003/0135631 A1* | 7/2003 | Li et al. | ......................... | 709/231 |
| 2006/0165166 A1* | 7/2006 | Chou et al. | ............... | 375/240.05 |
| 2006/0184688 A1* | 8/2006 | Ganguly et al. | .............. | 709/232 |
| 2008/0022005 A1* | 1/2008 | Wu et al. | ....................... | 709/231 |
| 2008/0086570 A1* | 4/2008 | Dey et al. | ....................... | 709/231 |
| 2008/0165861 A1* | 7/2008 | Wen et al. | ................ | 375/240.26 |
| 2010/0161825 A1* | 6/2010 | Ronca et al. | ................... | 709/231 |
| 2011/0019976 A1* | 1/2011 | Park et al. | ...................... | 386/294 |
| 2011/0023076 A1* | 1/2011 | Park et al. | ...................... | 725/116 |

\* cited by examiner

*Primary Examiner* — Krisna Lim
(74) *Attorney, Agent, or Firm* — Eitan, Mehulal & Sadot (57) ABSTRACT

Data packets to be transferred over a network as part of a temporally ordered content stream are obtained by an adaptive progressive download (APD) server. The APD server divides the data packets of the content stream into epochs of contiguous data, the epochs including a current epoch. The APD server determines a bit rate available on the network for transferring the current epoch and calculates an estimate of a playback time of the content stream buffered at a computer to which the content stream is being transferred and played back. The calculation of the estimate is based at least in part on the bit rate available on the network and an encoding bit rate of the content stream. The APD server controls the transfer of the content stream over the network in accordance with the estimated playback time.

20 Claims, 6 Drawing Sheets

ADAPTIVE PROGRESSIVE DOWNLOAD

BACKGROUND

1. Field of the Invention

The present invention relates to data communications and, more particularly, to managing download of progressive data for timed video and/or audio streams.

2. Description of the Related Art

Video streaming has become more and more popular. In video streaming, a client machine (such as a desktop or laptop computer or a Web-enabled mobile phone) receives a video stream from a video source over a network connection. Several communication protocol are developed and standardized in order to enable video transfer between video source and client machine, for example RTSP, RTMP, HTTP progressive download, MMS and custom protocols. Among these progressive download streaming of videos has become very popular. In progressive download, reproduction or playback of the video is started as a file download using HTTP protocol from the client end. As the chunks of video are downloaded the video playback is started after receiving a few seconds of video data without waiting until the entire video has been received. The remaining video is continuously downloaded, decoded and rendered. There has been tremendous demand for video viewing on the Internet and it's demand has increased demands on wireless networks due to ubiquitous coverage and mobile users demanding video anywhere. Unfortunately, the popularity of video streaming sometimes causes overloading of some bandwidth-limited networks, especially radio frequency (RF) wireless networks such as, for example, cellular telephone networks, WiFi networks, satellite networks, and the like.

The underlying network protocol used for video streaming could be TCP or UDP over IP networks. In recent years the network transfer protocol used for delivery of Internet traffic over all types of networks, including RF wireless networks, is the Transmission Control Protocol (TCP), used in conjunction with the Internet Protocol (IP) and often jointly referred to as TCP/IP. TCP provides reliable, ordered, error-free delivery of a stream of bytes from a program on one computer to a program on another computer. The bytes being transferred are typically organized into packets and routed using IP protocol. The TCP protocol has mechanisms for packet flow control, retransmission in case of packet loss, segment size, amount of data in pipeline, network congestion avoidance, and session control, e.g., establishment and termination.

Due to network congestion, traffic load balancing, switch memory overflow, physical link layer loss or other unpredictable network behavior, IP packets can be lost, duplicated, or delivered out of order at the receiving client. TCP detects data packet loss/delay problems, requests retransmission of lost packets, and rearranges out-of-order packets. TCP also tries to reduce network congestion to reduce the occurrence of the other problems by packet flow control. Once the TCP receiver at the client machine, which is part of operating system kernel, has finally reassembled a perfect copy of the data originally transmitted into a datagram, it passes that datagram to the application program of the client machine.

TCP is optimized for accurate delivery rather than timely delivery, and therefore, TCP sometimes incurs relatively long delays (on the order of seconds) while waiting for out-of-order messages or retransmissions of lost messages. Delays in reception of packets could underflow the video player resulting in stalled playback. Packets comprise collections of bytes of data, and may comprise multiples of MTUs.

Wireless links, however, are known to experience sporadic and usually temporary losses due to fading, shadowing, handoff, and other radio effects, that cannot be considered congestion. After the (erroneous) back-off of the congestion window size, due to wireless packet loss, TCP can enter a congestion avoidance phase with a conservative decrease in window size. This congestion avoidance phase can cause the radio link to be underutilized, causing reduced throughput.

Progressive download results in an aggressive (as fast as possible) download of video from the HTTP server over the network. This is another source of inefficient use of network when a user selects a video for download, watches a short portion of the video, and then stops watching the video. Since the progressive download transmits the video stream as quickly as possible, unviewed packets may be transmitted over the network and accumulated at the user machine, only to be discarded after the user stops watching the video. This wastes valuable network bandwidth and resources.

HTTP Progressive download using TCP is the predominant use case over the internet because of pervasive support of this video delivery being supported by Adobe Flash™, Microsoft Silverlight™ player, and Apple Quicktime™ players on PC and devices.

SUMMARY

In accordance with this disclosure, data packets to be transferred over a network as part of a temporally ordered content stream are divided into epochs of contiguous data. As used herein, an epoch is a segment of data, such as video and/or audio data, which can be independently manipulated from other epochs for transfer over a network as part of the temporally ordered content stream. The bit rate available on the network for transferring the current epoch is determined and an estimate of a playback time of the content stream buffered at a computer to which the content stream is being transferred and played back is calculated. The estimate of playback time is based at least in part on the bit rate available on the network and on an encoding bit rate of the content stream. The transfer of the content stream over the network is controlled in accordance with the estimated playback time. This mechanism is used to determine the bit-rate of the audio-video stream to be sent to the client.

The contiguous data to be transferred may comprise, for example, audio and/or video data that is encapsulated or multiplexed into a container wrapper for network transfer. The container wrapper may comprise formats such as .FLV, .MP4, .MKV, .WMV, or the like. The identified data packets of the audio video stream are divided into epochs of contiguous data, including a current epoch. The audio and/or video stream is sent during a communication session between a source of the content, such as a server computer, and a user computer to which the stream is being transferred. A communication session comprises a connection established between the user computer, a network, and the server computer so as to enable real time transfer of data between the server computer and the user computer. While sending the content stream, the bit rate available for transferring the current epoch and the video bit rate at which the current epoch is encoded, an estimate of a temporal amount of the data stream buffered at a computer to which the data stream is being transferred and played, is calculated. If the calculated estimate of the temporal amount of data stream buffered at the computer is below a first threshold, then a bit rate at which to re-encode the current epoch to maintain the temporal amount of the buffered data stream above the threshold is determined. This occurs due to reduced session data throughput, which is lower than a current bit-rate of data stream being sent. If the calculated estimate of the temporal amount of data stream buffered at the computer is above a second threshold, then the transfer of the current epoch without reduced data bit-rate is sent at a lower send rate to keep the buffered data below the second threshold.

A network may be capable of transporting video at a data transfer rate that is higher than the playback bit-rate during certain conditions. In those conditions, the data send rate is regulated from the server in relation to the playback bit-rate of the data stream being sent on the network, provided there is a safe amount of buffering at the client for playback. For example, the send rate could be the same or slightly higher than the bit-rate of the stream being sent.

Other features and advantages of the present invention will be apparent from the following description of the embodiments, which illustrate, by way of example, the principles of the invention.

DETAILED DESCRIPTION

Figure 1:
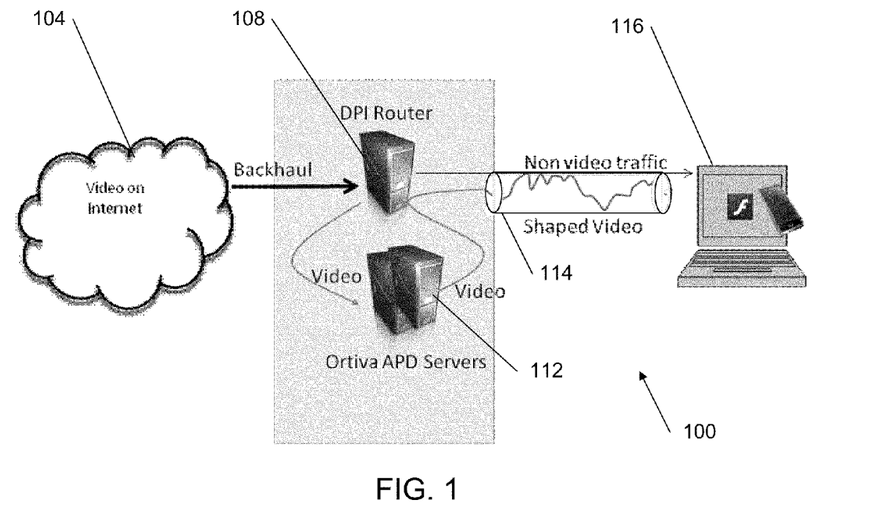
FIG. 1 is a high level functional block diagram of a system for managing progressive download of streaming data.

A high level functional block diagram of a system 100 for managing progressive download of temporally ordered streaming data is shown in FIG. 1. In the illustrated system 100, digital data is received by a router 108 from a network 104 such as, for example, the Internet. The network 104 could also be a backhaul network for a cellular network, a satellite network, or other wireless network. The digital data received by the router 108 includes multiple types of data, including temporally-ordered content streams (referred to herein as content streams) such as video, audio, and combined audio/video. In this embodiment, the content streams are transported using an HTTP-based progressive download (PD) mechanism such as those used by Adobe Flash™ or Microsoft Silverlight™.

The router 108, in this embodiment, is a Deep Packet Inspection (DPI) router. The router 108 intercepts the digital traffic received from the network 104 and filters out the content streams from other types of traffic. All the content stream traffic and the other digital traffic, including, for example, HTML, JPEG, Binary Streams, and the like, is transferred over the network using the HTTP protocol. The router 108 separates the content streams from the other digital traffic based on MIME-type. The non-content stream traffic is forwarded from the router 108 to user equipment 116 over a subnetwork 114. The user equipment 116 in this case could be a laptop computer, personal computer (PC), set-top box, netbook, cell phone, mobile internet device (MID), and the like. The subnetwork 114 could include one or more wireless or wireline networks.

The router 108 redirects the content stream traffic to one or more adaptive progressive download (APD) servers 112. The system 100 of FIG. 1 includes two APD servers 112, but other systems could include more or fewer APD servers 112. Multiple APD servers 112 could be used to load balance between them and to provide redundancy.

The APD servers 112 manage transfer of the content streams over the subnetwork 114. Much of the traffic making up the content stream traffic is Internet video and is displayed on client devices using mechanisms such as Adobe Flash™ or Microsoft Silverlight™ technology. Both of these technologies support several video codecs such as H.264, VC-1, On2, and VP6. For audio signals, these technologies are capable of supporting audio codecs such as AAC, AAC++, mp3, ADPCM, Windows Media Audio, and the like.

Content streams using Adobe Flash™ or Microsoft Silverlight™ technologies utilize compressed data for both audio and video. The compressed audio and video data are encapsulated in container formats commonly known as Adobe Flash FLV container or Windows Media Video (WMV) file container format. These container formats provide timestamps for rendering of audio and video data, and provide separate bins/packets to describe audio, video, or text packets.

In a typical delivery, FLV or WMV files are hosted on a web-server. Flash Player™ Silverlight™, or Windows Media Player™ plugins are hosted in a Web page that provides the URL of the content stream to end users. The hosting Web server also sets the appropriate MIME-type as video/x-flv or video/x-ms-wmv (see http://support.microsoft.com/kb/288102). In this way, a receiving browser knows to load the appropriate plugin to render the data which is delivered on the HTTP protocol.

Content streams directed at video players are typically transported over HTTP using TCP transport. As discussed above, TCP was not designed for transporting data over networks that are susceptible to dropouts and fades, such as modern wireless networks. In addition, content streams that are transported over networks using HTTP progressive download typically use all the bandwidth available on the network without regard to whether or not the end user needs or wants all the content stream data as quickly as possible. The APD servers 112 estimate network conditions, estimate the temporal amount of content stored in a clients buffer, and manage transport of the content streams being transported over the subnetwork 114 using TCP.

Figure 2:
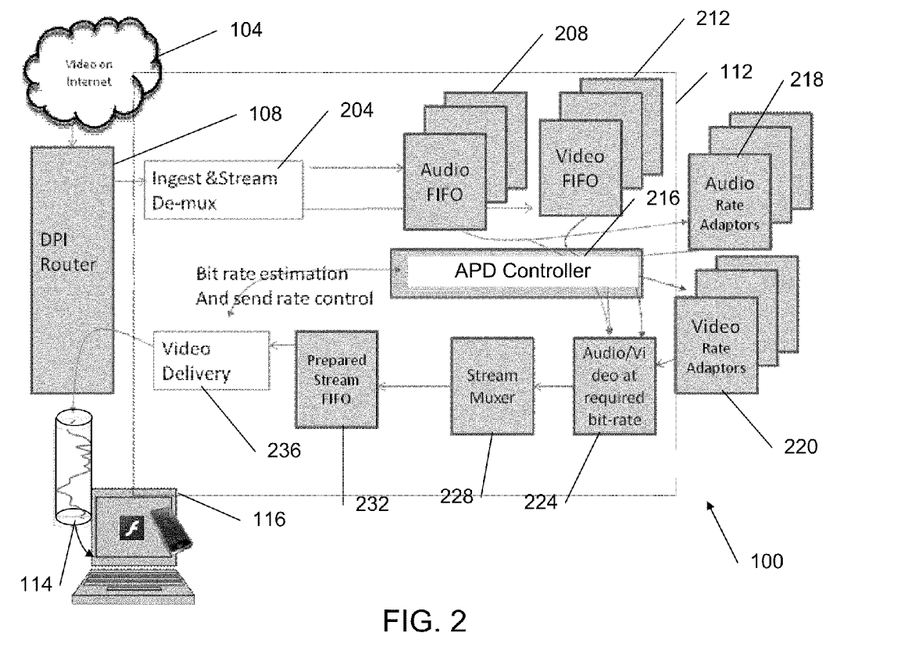
FIG. 2 is a functional block diagram of the system of FIG. 1 illustrating subsystems of an adaptive progressive download (APD) server employed in the system.

FIG. 2 is a more detailed functional block diagram of the FIG. 1 system 100. FIG. 2 shows various subsystems of the APD server 112, including a content stream ingest and demultiplexer (de-mux) subsystem 204, input audio first-in-first-out (FIFO) buffers 208, input video FIFO buffers 212, an APD controller 216, a multiplexer queue 224, a content stream multiplexer 228, a content stream output FIFO buffer 232, and a delivery interface 236.

The ingest/de-mux subsystem 204 receives content data streams that have been intercepted by the router 108. The multiple content streams can be in one of a plurality of container formats such as Adobe FLV or Microsoft WMV. The ingest/de-mux subsystem 204 splits the individual content streams into audio and video substreams. The individual audio substreams are stored in corresponding buffers of the audio FIFO buffer 208. The audio substreams can be transcoded or re-encoded for bit rate reduction in some embodiments. The sampling rate of audio is determined at the beginning of content stream processing and is kept fixed for the duration of the content stream. However, the bits assigned per packet due to quantization can be changed. This fixed audio sampling rate is due to a limitation of some sound cards being unable to work with variable sampling frequencies. If this limitation is not present in the given embodiment, the audio sampling frequency could be changed within the content stream as it is processed.

The ingest/de-mux subsystem 204 splits the individual video substreams into epochs, In the illustrated system, the epochs are of about five seconds in length. An epoch length of about five seconds is a reasonable compromise that allows a sufficiently large piece of video to be sent to the client to have a reasonable impact on the amount of video stored in the client buffers, while at the same time not putting the APD server 112 into a situation where the adapted bitrates would be changed too frequently. Changing bitrates too frequently can over burden the APD server 112 or have a higher likelihood of developing into an oscillatory cycle. Other time periods for the epochs may be selected in accordance with available resources of the system. The individual video epochs are stored in corresponding buffers of the video FIFO buffer 212. Typically, the ingest/de-mux subsystem 204 tries to download the content streams from the a source, e.g., a video server, as fast as possible, pausing if the audio or video FIFOs 208 and 212 are approaching maximum capacity. The ingest/de-mux subsystem 204 can also be paused if FIFO buffers are full due to slow egress for delivery of the video and audio from the delivery interface 236.

While splitting the video of the content stream into epochs, the ingest/de-mux subsystem 204 looks for an intra-coded frame, or I-frame (also referred to as an IDR_FRAME in H.264 codecs), which is at the beginning of a GOP beginning boundary which will be the start of the next epoch. Those skilled in the art will understand that a "GOP" refers to a group of pictures comprising a collection of consecutive frames of video. The frames within a GOP typically comprise either I-frames, P-frames, or B-frames. According to the MPEG standard, as noted above, a GOP ordinarily begins with an I-frame. Video frames at a GOP boundary are not typically dependent on reference frames of a previous GOP. In this way, each epoch can be decoded independently of other epochs. That is, each epoch can be manipulated independently of the other epochs for transfer over the network. I-Frames are typically encoded every 30 to 60 frames but could occur less frequently. Hence, the epochs are nominally about five seconds of viewing time and could be typically under seven seconds.

The ingest/de-mux subsystem 204 determines characteristics of the encoded audio and video epochs and provides these characteristics to the audio and video FIFO buffers 208 and 212 to be stored along with the corresponding epochs. The characteristics can include average bit rate for the epoch, frame rate(s), number of frames in the epoch, and beginning and ending time stamps. These characteristics can be used by the APD controller 216 in managing the video streams.

The APD controller 216 determines the rate at which to send the multiplexed stream (e.g., video and audio epochs) to the user equipment 116. The APD controller 216 also determines when to re-encode the video or audio epochs to adapt the bitrate, frame rate, or other characteristic of the video epoch to adapt to network conditions. The APD controller 216 uses two main measurements in determining when to send epochs and when to re-encode epochs. The two main measurements used by the APD controller 216 in managing the transport of the content streams are an estimated network bandwidth being provided by the subnetwork 114 and an estimate of the temporal amount of an individual content stream stored at the user equipment 116.

The APD controller 216 calculates an estimated per session bandwidth. The APD controller counts the number of packets sent out of the video FIFO buffer 232 and receives corresponding feedback from the router 108 via the delivery interface 236 due to blocking backoff in sockets of the delivery interface while sending packets to the router 108. In some embodiments, the APD controller 216 receives successful delivery acknowledgement from TCP stack on the Server which is due TCP feedback (ACKs) from a server delivering the content stream to the user equipment 116 over the subnetwork 114. The TCP feedback is used, along with the knowledge of the size of the data packets, to calculate a current network bandwidth being utilized for the individual content stream. The bandwidth estimate can be based on the successful data delivered over a period of a few seconds.

Figure 5A:
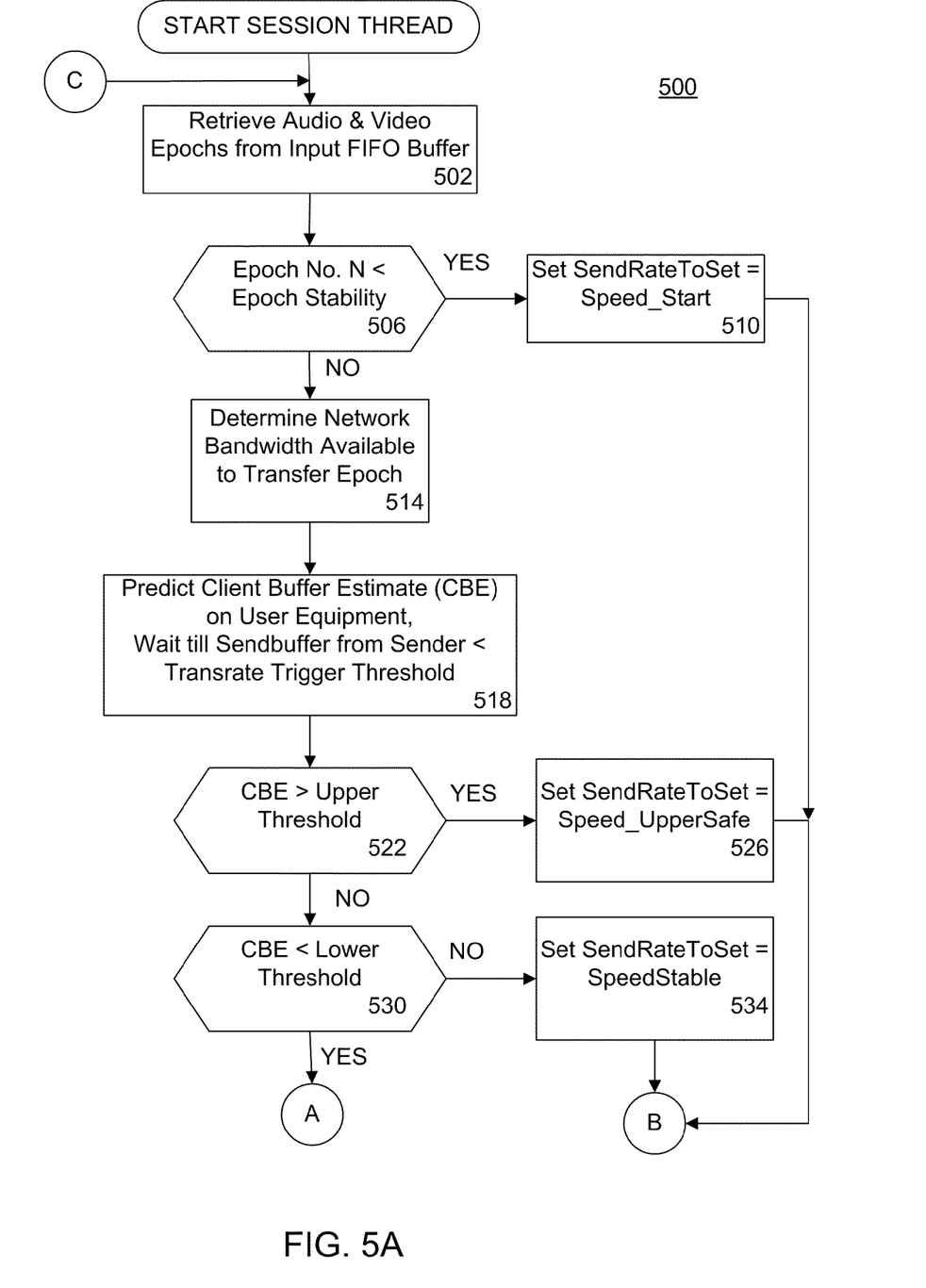
FIGS. 5A and 5B show a flow diagram of operations performed by subsystems of the APD server and video encoders of FIG. 2.
Figure 5B:
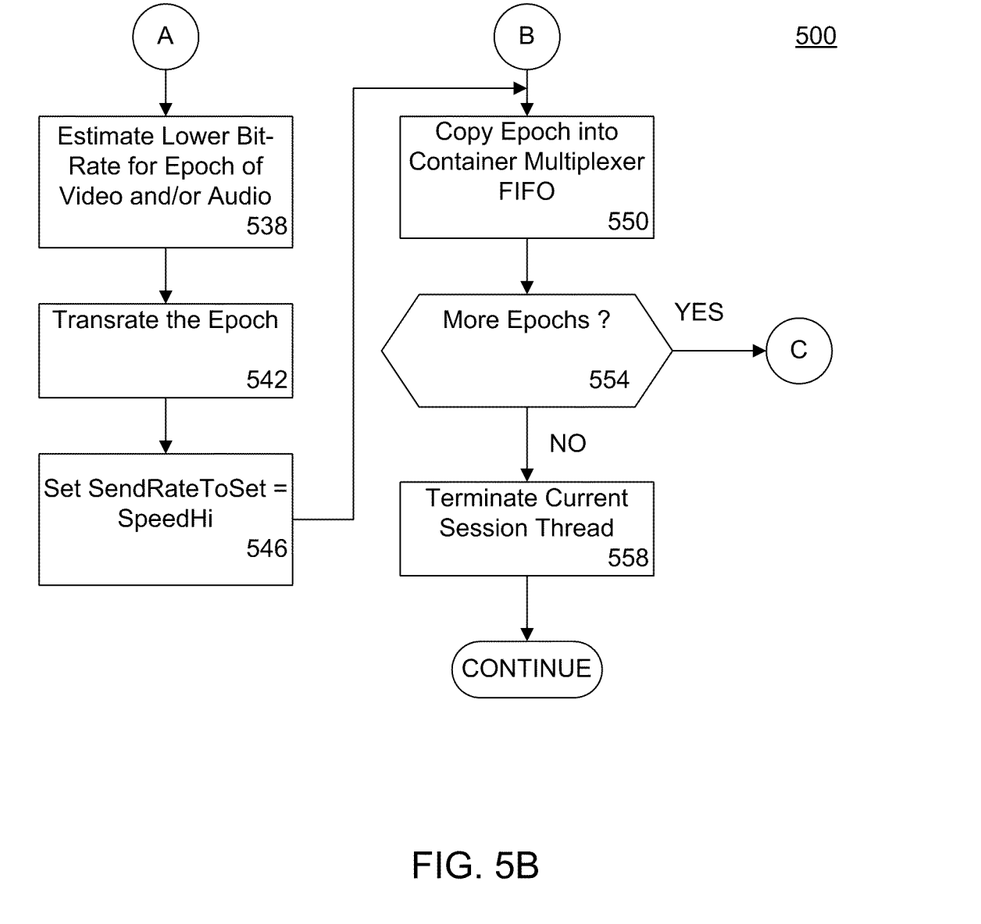

To determine the temporal amount of a content stream stored at the user equipment 116, the APD controller 216 keeps track of the duration of the epochs (in seconds of viewing time) that have been delivered via the delivery interface 236. The ADP server 112 also keeps track of the average video rate of the epochs, the estimated network bandwidth being utilized to transport the video, and previous estimates of the temporal amount of content stored at the user equipment 116 by knowing the timestamps of multiplexed audio/video being sent over network. Because TCP does not suffer from packet loss, any epochs delivered by the delivery interface 236 to the router 108 will eventually arrive at the user equipment 116 or the TCP stack will not give a successful send acknowledgement to the APD controller 216. The unresolved issue is how fast that arrival occurs for an epoch of the multiplexed stream, and resolution of that issue depends on the available bandwidth, which is being monitored. The ADP controller 216 can estimate the session bandwidth in near realtime. Details of the methods performed by the APD controller in managing the content streams are discussed below in reference to FIG. 5.

Figure 3:
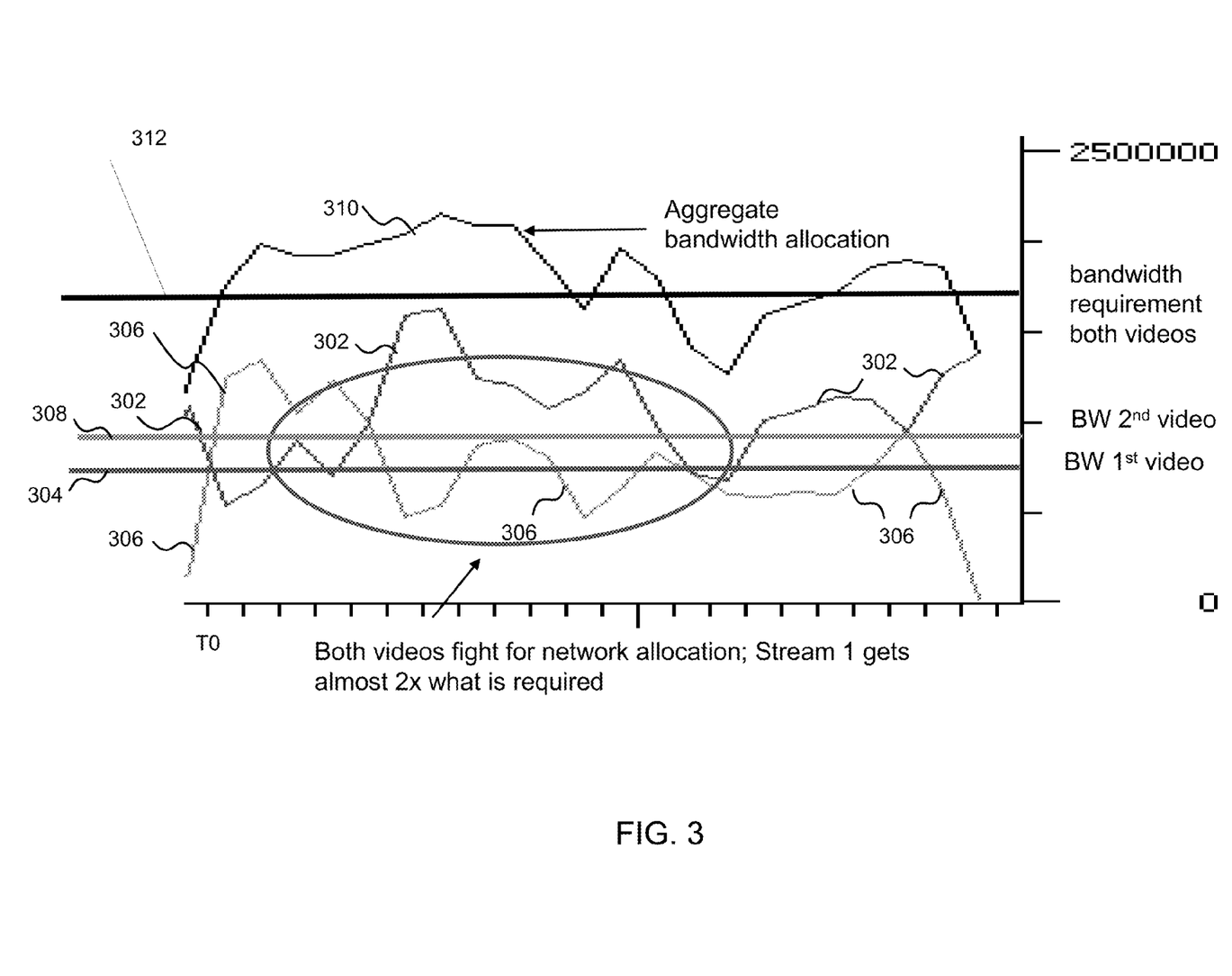
FIG. 3 is a graph showing sample download rates for two progressive data streams being transferred simultaneously over a network.

FIG. 3 shows a time history of the video delivery rates over the subnetwork 114 for a first video stream 302 and a second video stream 306. The first video stream 302 has an average video bitrate BW1, which is illustrated as a constant line 304 designated "BW 1st video". The second video stream 306 has an average video bitrate BW2, which is illustrated as a constant line 308 designated "BW 2nd video". The aggregate combined video stream 310 is the total of the two separate streams 302, 306. The combined average video bitrate (BW1+BW2) is illustrated by the line 312 designated "bandwidth requirement both videos." Due to the progressive download nature of streaming, the network scheduler tries to assign equal bandwidth resources to the two sessions. FIG. 3 illustrates an example situation where the APD controller 216 can slow down the delivery rate of a pair of content streams to improve the efficiency of the subnetwork 114.

As illustrated in FIG. 3 the first video stream 302, in some cases, is assigned more bandwidth than it requires, while the second video stream 306 gets less bandwidth. The APD controller 216 reduces the send rate for the first video stream 302, so that the network scheduler can assign the free resources to the second video stream 306, for which the APD controller 216 is trying to send at a higher rate compared to the first video stream 302. The APD controller 216 is helping at allocating a fair amount of bandwidth required by each concurrent session and thereby increasing the number of concurrent sessions which can have a satisfying video viewing experience.

As illustrated in FIG. 2, the APD controller 216 is coupled to a bank of audio encoders 218 and a bank of video encoders 220. A "bank" of video encoders 220 is typically controlled by one APD controller 216 because video encoding is a much more computationally demanding task than the tasks performed by the APD controller 216. Similarly, audio encoding could also require a bank of audio encoders 218. If the APD controller 216 determines that a lower bit rate for the current epoch of video and/or audio is needed, the APD controller 216 triggers the video encoders 220 and/or the audio encoders 218 to re-encode the video stream and/or the audio stream, respectively, at specified bitrates. The APD controller 216 controls the audio encoders 218 and the video encoders 220 to re-encode portions of audio and/or video to maintain client buffers at or above a low buffer limit. In some embodiments, the low buffer limit is referred to as the "Safe Limit," which represents the smallest buffer size at which the user equipment is likely to be safe from running out of data during playback. When the estimated session bandwidth falls below the current average video bitrate of an epoch, the buffer at the user equipment 116 begins to run out of video data. If it is predicted to fall below the "Safe Limit" after playing the current epoch that the APD controller is processing, the APD controller 216 can control one of the video encoders 220 to transrate/re-encode the epoch to reduce the average video bitrate to a level that can be more quickly transported with the current network conditions. To conserve the resources of the video encoders, the APD controller 216 can delay encoding of an epoch until it is needed. The rate of ingest of video is faster than the rate at which the APD controller 216 is processing the video for encoding by the bank of video encoders 220. The decision to start re-encoding is made by the APD controller 216 taking into consideration the amount of time needed to retransrate the video epoch by the video encoders 220.

The "Safe Limit" is a minimum amount of playback time that should be maintained at the user equipment 116 to provide for playback that spans over the longest dropouts likely to be experienced over the subnetwork 114 during a session. This "Safe Limit" is network-dependent. Some networks and locales are more robust than others. Data can be gathered for various wireless networks to determine a statistical upper limit for the longest expected dropout. The Safe Limit can be determined empirically for a network through gathering data on the specific network. The value of the Safe Limit can depend on the type of wireless network, e.g., 3G, 3.5G, or 4G or any fast network, as well as whether soft handover or hard handover is used. This upper limit can be used to set the Safe Limit for a particular network. One network might have a Safe Limit of about one second, while another less reliable network might have a Safe Limit of about 20 seconds or more. Keeping the playback time of the content stream stored in the buffers of the user equipment above the Safe Limit should prevent the buffers from emptying during most dropouts.

The video encoders 220 utilize various customizing operations to reduce the video bitrate of video streams to meet the video bitrate determined by the APD controller 216. The customizing operations are carried out frame-by-frame on the video stream. For each frame, the available customizing operations are selected from a set including frame rate for the video content, frame type for the frame, and quantization level for frame compression. The specification of customizing operations relating to frame type include specifying that the frame under consideration should be either a P-frame or an I-frame. The specification of quantization level can be specified in accordance with predetermined levels, and the specification of frame rate relates to the rate at which the digital video content frames will be sent to the particular user equipment 116. Thus, the resulting re-encoded video stream includes a selection of customizing operations including a combinations of frame types, quantization levels, and frame rates that meets the reduced video bitrate requested by the APD controller 216.

During certain low network conditions, it is desirable to reduce the data rate of audio and/or video Streams. The APD Controller 216 can decide, in extremely low network conditions, to re-rate or re-encode the audio from the input audio FIFO 208. In order to achieve audio encoding, the bank of audio encoders 218 is used. The output from the bank of audio encoders 218 is given to the stream multiplexer 228 input queue.

When the video encoders 220 finish re-encoding an epoch of a video stream, the video stream epoch is communicated to an input queue of the video interface 224 of the APD server 112. The video interface 224 also receives epochs that have not been re-encoded from the APD controller 216. The video interface 224 forwards the re-encoded and non-re-encoded epochs to the content stream multiplexer 228. The content stream multiplexer 228 reunites the video epochs received from the video interface 224 with the corresponding audio epochs that were stored in the audio FIFOs 208. The content stream multiplexer 228 creates new containers including synchronized audio and video. The containers can be in, for example, Adobe FLV or Microsoft WMV format. Upon reuniting the audio and video epochs, the content stream multiplexer 228 forwards the containers to the output FIFO buffer 232.

The content stream containers are stored in the output FIFO buffer 232 until the delivery interface 236 retrieves them for delivery to the router and subsequent delivery to the corresponding user equipment 116. The delivery interface 236 is controlled to deliver the content stream epochs as determined by the APD controller 216 to keep the temporal amount of content stream stored in the buffer of the user equipment 116 at a desired level, as discussed above.

Figure 4:
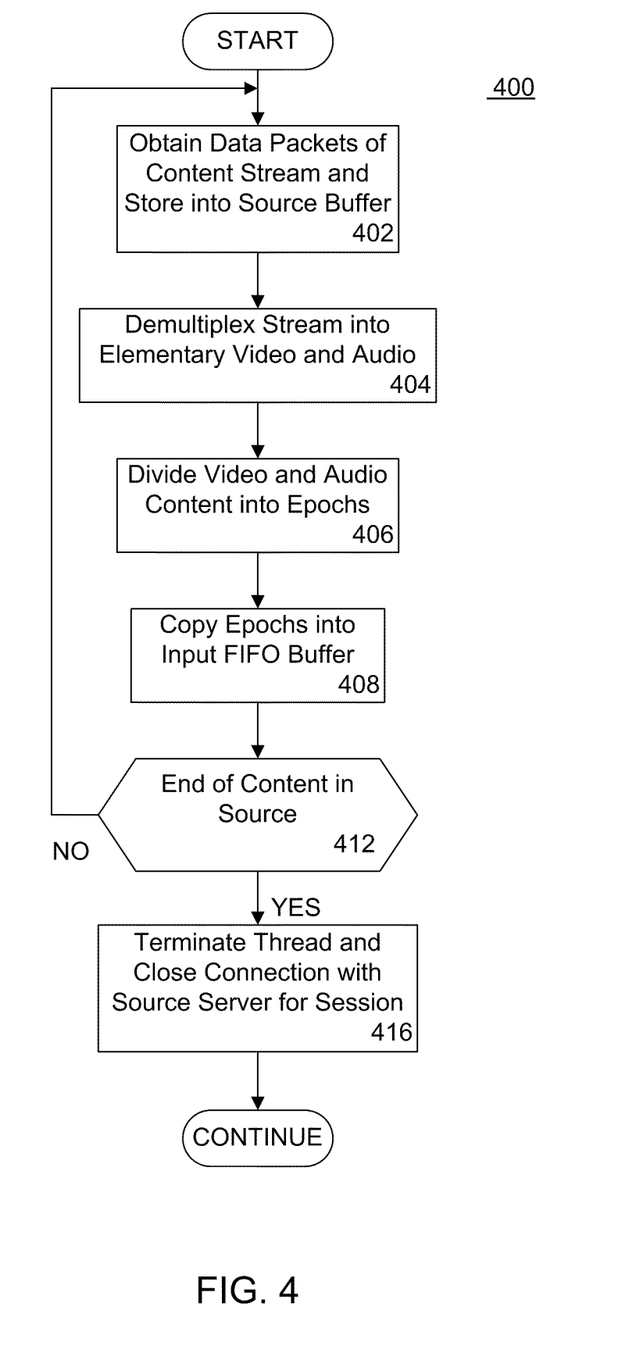
FIG. 4 is a flow diagram of the operations performed by the ingest/demultiplexer subsystem of the APD server of FIG. 2.

FIG. 4 is a flow diagram of the operations performed by the ingest/de-mux subsystem—204 of the APD server 112 for each multimedia session of FIG. 2. In the first operation, indicated by the box 402 in the process 400, the content streams are intercepted by the router 108 and forwarded to the ingest/de-mux subsystem 204. As noted above, a session comprises an established communication between a user computer and a server computer. A video streaming session is re-established with each new video URI request. Upon receiving the content streams, the ingest/de-mux subsystem 204 demultiplexes the content streams into elementary video and audio substreams at box 404. At box 406, the ingest/de-mux subsystem 204 divides the video and audio substream into variable length epochs as discussed above. The variable length video epochs and the corresponding audio epochs are copied into the video and audio FIFO buffers 208 and 212, respectively, at box 408. In addition to storing the audio and video epochs, additional information regarding the characteristics of the audio and video epochs are determined by the ingest/de-mux subsystem 208 and stored in the audio and video FIFO buffers 208 and 212, respectively. This additional information includes the average bit rate for the audio and video epochs, frame rate(s), number of frames in the epoch, and beginning and ending time stamps. If more content stream data is available for retrieval, a "YES" outcome at the decision box 412, the process 400 repeats the operations of boxes 402, 404, 406, and 408. If no more content stream data is available, a "NO" outcome at the decision box 412, the process 400 terminates the current session with the source video server and continues to listen for new video connection at the start of the process 400.

FIGS. 5A and 5B show a flow diagram of the operations performed by the APD Controller 216 of the APD server 112 and the video encoders 220 of FIG. 2. During the process 500, the APD controller 216 varies the rate at which video is sent to the network. The variable send rate is denoted by the variable SendRateToSet. In addition, the APD controller 216 determines if the current video epochs should be changed to a different rate, by performing an action referred to from herein as transrating.

In the first operation, indicated by the box 502, the APD controller 216 retrieves the next audio and video epochs in a content stream from the audio and video FIFO buffers 208 and 212, respectively. In addition to retrieving the video epoch, the APD controller 216 retrieves the other audio and video data stored in the audio and video FIFO buffers 208 and 212, including the average bit rate for the video epoch, the average bitrate of the corresponding audio epoch, frame rate(s), number of frames in the epoch, and beginning and ending time stamps. Upon retrieving the video epoch, the process 500 continues to decision box 506. In this example, if the video epoch retrieved at box 502 is one of the first epochs in a content stream, denoted by a variable Epoch Stability, the APD controller 216 performs the operations represented by box 510. The value of Epoch Stability can be in a range from about one to about three epochs. The value of Epoch Stability is chosen to provide enough video data to get the client buffer to a stable level. In some networks the Epoch Stability could be zero and the first epoch would be transrated at some provisioned bit-rate The APD controller 216 sets the SendRateToSet variable equal to Speed_Start. The value of the Speed_Start variable is typically in a range from about 1.2 to about 1.6 times the bit rate at which the video is being played back at the client. For example, if the video bit rate is 1 Mbps, then Speed_Start would be in a range from about 1.2 Mbps to about 1.6 Mbps. A higher start rate is used so as to build the safe client buffer quickly. Stalling of video in beginning provides poor quality of experience while watching video. Upon setting the SendRateToSet variable at box 510, the process 500 continues to box 550, where the APD controller 216 forwards the video epoch toward the video interface 224, which copies the epoch into a FIFO buffer of the content stream multiplexer 228, which recombines the video epoch with the corresponding audio epoch and copies the audio/video epoch to the output FIFO buffer 232. Since no data, or at least no reliable data regarding network conditions can be determined prior to transferring the first several epochs of the content stream to the user, the first several epochs are forwarded directly to the user equipment 116. By forwarding the first several epochs directly to the user equipment 116, the APD controller 216 can receive feedback, from the router 108, in order to start estimating the network conditions to actively manage the transport of the content stream.

Upon retrieving a number of epochs greater than the value of Epoch Stability and beyond at box 502, and after receiving feedback from the server 108 regarding the transport of the first several epochs (the receiving of feedback is not shown in FIG. 5), the process 500 proceeds to box 514 where the APD controller 216 determines the network bit rate that has been available in transferring the previous epochs to the user equipment 116, as discussed above. In one embodiment, the epochs of the video stream are divided into small packets of a plurality of MTUs (e.g., four MTUs), where an MTU is the maximum transmission unit size that the content stream is being transported by the DPI router 108. A typical value of MTU is about 1260 bytes. When the delivery interface 236 sends the epoch packets to the router 108, a TCP socket is established. The TCP Socket with the router 108 is set in blocking mode such that, whenever a packet is sent to the router 108, it will be delivered and can be counted as a sent packet. The delivery interface 236 then counts the number of packets in a content stream that have been sent in a period of time, such as one or two seconds, for example. Knowing the packet size, the APD controller 216 uses this count information to calculate the bit rate at which the content stream is being delivered to the user equipment 116.

In one embodiment, the feedback used to estimate the network bandwidth at box 514 is an amount of time to taken to write packets to the TCP kernel of the router 108. TCP write commands utilize a blocking code and the write command doesn't return from the blocking function call until the write command completes. Once the write command returns, another packet is written to the TCP kernel and this process continues. When TCP networks start to slow down, the write commands start to slow down, indicating a slowdown in responsiveness of the TCP kernel. When packets are written to the TCP kernel, the TCP kernel monitors ACKs from the receiving end for each TCP packet. When a network slows down, the TCP acknowledgements start to slow down and then the write commands to the TCP kernel start to be blocked for longer periods of time. Therefore, the APD controller 216 uses the length of time that the write command is blocked as an indication that the TCP network is slowing down.

The APD controller 216 calculates the number of bytes sent with each write command to determine a network transfer rate for a particular thread. The data can be gathered over a time window in order to smooth the estimate. The packet sizes of the packets that have been written to the TCP kernel are time stamped in order to track the packets over different window sizes. In some embodiments, the length of the window is varied depending on the speed at which the write commands are changing (e.g., a smaller window is used when the speed of the write commands is changing quickly, and longer windows are used when the write commands are stable). The window length can be in a range from about 1 second to about 10 seconds. The network heuristics are also applied for the bit-rate calculation to correct the estimated session bandwidth, which are applied for example—in certain carrier deployment of EVDO network maximum bandwidth can be 3.5 Mbps, typical packet loss, TCP RTT information for the network.

In the operations indicated by the box 518, the APD controller 216 calculates an estimate of the playback time of the content stream that is buffered at the receiving user equipment 116. In one embodiment, the estimated playback time of the buffered contents stream (denoted CBE) is calculated as:

$$CBE = CBo + (\text{BW\_video} - \text{Bitrate\_video}) * \frac{EpochDuration}{\text{Bitrate\_video}} \quad (1)$$

Where:
  CBo is the previous buffer estimate (CBE) calculated before the current epoch;
  Bitrate_video is the average video bit rate of current epoch that was determined by the ingest/de-mux subsystem 204 and stored in the video FIFO 212;
  EpochDuration is the time duration of the current epoch; and
  BW_forvideo is the bandwidth available for video, which is calculated using the following relationship:

$$BW\_forvideo = NetBW - brAudio - brOverhead \quad (2)$$

Where:

NetBW is the estimated network bandwidth determined by the APD controller 216 at box 514 brAudio is the bitrate of the audio stream determined by the ingest/de-mux subsystem 204 and stored in video FIFO 212, and and brOverhead is the bit rate of packet overhead in the content stream.

Using equations (1) and (2), the APD controller 216 calculates the amount of playback time of video that will be in the buffers of the user equipment 116 after playback of the current epoch. Tables 1-4 list exemplary calculations for an epoch with a duration of 5000 msec transported at adapted video bitrates (Bitrate_video) of 800 kbits per second, 650 kbits per second, 500 kbits per second, and 400 kbits per second, respectively. Each table lists eight calculations of CBE, using equation (1), for eight different network conditions where the network bandwidth available for transporting video (as determined at box 514) varies from 800 kilokbits per second to 100 kilo-kbits per second. In each case, the CBo is 4000 msec, the epoch duration is 5000 msec, and the bit rate of the unmodified video stream (Bitrate_Video) is 800 kilokbits per second.

TABLE 1

| CBo (msec) | BW_video (kbits/sec) | Epoch_Duration (msec) | Bitrate_video (kbits/sec) | CBE (msec) |
|---|---|---|---|---|
| 4000 | 800 | 5000 | 800 | 4000 |
| 4000 | 700 | 5000 | 800 | 3375 |
| 4000 | 600 | 5000 | 800 | 2750 |
| 4000 | 500 | 5000 | 800 | 2125 |
| 4000 | 400 | 5000 | 800 | 1500 |
| 4000 | 300 | 5000 | 800 | 875 |
| 4000 | 200 | 5000 | 800 | 250 |
| 4000 | 100 | 5000 | 800 | −375 |

TABLE 2

| CBo (msec) | BW_video (kbits/sec) | Epoch_Duration (msec) | Bitrate_video (kbits/sec) | CBE (msec) |
|---|---|---|---|---|
| 4000 | 800 | 5000 | 650 | 5153.8 |
| 4000 | 700 | 5000 | 650 | 4384.6 |
| 4000 | 600 | 5000 | 650 | 3615.4 |
| 4000 | 500 | 5000 | 650 | 2846.2 |
| 4000 | 400 | 5000 | 650 | 2076.9 |
| 4000 | 300 | 5000 | 650 | 1307.7 |
| 4000 | 200 | 5000 | 650 | 538.5 |
| 4000 | 100 | 5000 | 650 | −230.8 |

TABLE 3

| CBo (msec) | BW_video (kbits/sec) | Epoch_Duration (msec) | Bitrate_video (kbits/see) | CBE (msec) |
|---|---|---|---|---|
| 4000 | 800 | 5000 | 500 | 7000 |
| 4000 | 700 | 5000 | 500 | 6000 |
| 4000 | 600 | 5000 | 500 | 5000 |
| 4000 | 500 | 5000 | 500 | 4000 |
| 4000 | 400 | 5000 | 500 | 3000 |
| 4000 | 300 | 5000 | 500 | 2000 |
| 4000 | 200 | 5000 | 500 | 1000 |
| 4000 | 100 | 5000 | 500 | 0 |

TABLE 4

| CBo (msec) | BW_video (kbits/sec) | Epoch_Duration (msec) | Bitrate_video (kbits/sec) | CBE (msec) |
|---|---|---|---|---|
| 4000 | 800 | 5000 | 400 | 9000 |
| 4000 | 700 | 5000 | 400 | 7750 |
| 4000 | 600 | 5000 | 400 | 6500 |
| 4000 | 500 | 5000 | 400 | 5250 |
| 4000 | 400 | 5000 | 400 | 4000 |
| 4000 | 300 | 5000 | 400 | 2750 |
| 4000 | 200 | 5000 | 400 | 1500 |
| 4000 | 100 | 5000 | 400 | 250 |

Table 1 represents transporting the video stream at the unmodified bitrate of 800 kbits per second. Tables 2, 3, and 4 represent transporting the video stream at modified bitrates of 650 kbits per second, 500 kbits per second, and 400 kbits per second, respectively. As can be seen from this description, when the encoded bitrate of the video, the Bitrate_video column, is greater than the BW_video bitrate, the CBE is less than the original CBo after playing back the current 5000 msec epoch. Conversely, if the encoded bitrate, Bitrate_video, is less than the available bandwidth BW_video, then the estimated CBE is greater than the original CBo. The APD controller 216 can choose which Bitrate_video to re-encode an epoch by targeting one or more threshold levels of CBE. For example, if the target level of CBE is 6000 msec, and the available bandwidth is 500 kbits per second, then the APD controller 216 could control the video encoders 220 to encode the current epoch at 400 kbits per second because this bitrate results in an estimated buffer size of 5250 msec, which is the closer to the target of 6000 msec. CBE also adds the margin in calculation based on average round trip time (RTT time) to estimate the number of packets that could be in routers/switches in between.

The operations illustrated in boxes 522, 526, 530, 534, 538, 542, and 546 serve to maintain the buffered playback time at the user equipment 216 between a lower threshold and an upper threshold. The lower threshold may be the "Safe Limit" threshold discussed above, which is greater than the maximum expected dropout period for a certain network with a few seconds of extra safety margin during which no bandwidth is available for transporting the video data. At decision block 522, the estimated buffer playback time CBE for the unmodified video stream being transported at the current available network bandwidth is compared to the upper threshold. If the unmodified CBE is determined to be greater than the upper threshold playback time at box 522, then the APD controller 216 sets the SendRateToSet that the delivery interface 236 uses to deliver the current epoch to the router 108 at box 526 to a value of Speed_USafe. The value of Speed_USafe is a multiple of the playback bitrate in a range from about 1.0 to about 1.2 times the playback bitrate. After setting the SendRateToSet at box 526, the process 500 proceeds to box 550 where the APD controller 216 forwards the video epoch toward the video interface 224, which copies the epoch into a FIFO buffer of the content stream multiplexer 228, which recombines the video epoch with the corresponding audio epoch and copies the audio/video epoch to the output FIFO buffer 232.

If, at box 522, the CBE after playback of the current epoch is determined not to be greater than the upper threshold, the operations represented by decision box 530 are performed. At Box 530, if it is determined that the CBE is not less than the lower threshold, the process 500 proceeds to box 534. At box 534, the APD controller 216 sets the SendRateToSet variable equal to SpeedStable. The bitrates of SpeedStable are in a range from about 1.1 to about 1.2 times the playback bitrate of the video. Such values tend to keep the client buffer stable unless network conditions change. After setting the SendRateToSet at box 534, the process 500 proceeds to box 550 where the APD controller 216 forwards the video epoch toward the video interface 224, which copies the epoch into a FIFO buffer of the content stream multiplexer 228, which recombines the video epoch with the corresponding audio epoch and copies the audio/video epoch to the output FIFO buffer 232.

If it is determined at decision box 530 that the CBE is less than the low threshold, the process 500 continues to box 538. At box 538, the APD controller 216 determines a lower bitrate at which to re-encode the current video epoch in order to achieve buffered video content above the lower threshold. The APD controller 216 can calculate CBEs for multiple values of Bitrate_video at the current network bandwidth available for delivery of video (BW_video), as determined at box 514. The CBE calculations listed in Tables 1-4 represent the types of calculations that the APD controller 216 can perform at the box 538. Performing operations illustrated by box 542, the video encoders 220 convert (e.g., transrate) the current epoch to the video bitrate determined by the APD controller 216 at the box 538. The operations performed at box 542 can include modifying the frame rate, modifying the frame type, changing the quantization level, and so forth.

At box 546, the APD controller sets the SendRateToSet variable to a value SpeedHi. The SpeedHi bitrate is in a range from about 1.3 times to about 2.0 times the modified playback bitrate of the transrated video epoch. In some embodiments, SpeedHi for a transrated epoch is capped to the value of SpeedStable. Proceeding to box 550, the APD controller 216 forwards the current epoch in its re-encoded state to the input queue of the video interface 224 to be copied to the stream multiplexer 228 and finally to the output FIFO buffer 232.

At stage 554, the APD controller 216 determines if more epochs remain in the current session thread to be transported. If it is determined that more epochs remain, the process returns to box 502 to retrieve additional audio and video epochs. If it is determined that no more epochs remain at decision box 554, the current session thread is terminated by the APD controller at box 558.

Using the example video bitrates listed in Tables 1-4, if it determined that a current epoch needs to be re-encoded at a lower bitrate than the last epoch, it is preferable to decrease the bitrate in small increments. For example, if the last epoch was transported at an unmodified 800 kbits per second, and if the current epoch needs to be re-encoded at a lower bitrate, then the current epoch should be transported at an incrementally lower rate such as no less than 650 kbits per second. This incremental decrease avoids drastic decreases in video quality and provides for a more enjoyable viewing experience at the user equipment 116. Similarly, increases in video bitrate can also be taken in incremental steps to avoid drastic increases in quality, which can detract from the viewing experience.

In some embodiments, the APD controller 216 delays triggering the video encoders 220 to re-encode the current video epoch at box 542. This can avoid re-encoding of epochs so far in advance that operation becomes inefficient. In these embodiments, the video encoders 220 are triggered to re-encode when the time (Transrate_trigger_Threshhold) of video left in the output FIFO 232 minus the time it takes to encode the epoch using the determined Bitrate_video is less than a predetermined time, such as 2 seconds, for example. The delivery interface 236 monitors how much playback time of a video stream remains in the output FIFO 232. The delivery interface 236 is also aware of the time (TimeVAProc which is less then Transrate_trigger_Threshhold) it takes to perform the re-transrating for the type of stream that is being processed based on profiling different sets of video. Using data received from the delivery interface 236, the APD controller 216 triggers the video encoders 220 to perform the re-encoding when the amount of time remaining in the output FIFO 232, MixBuffLeft, is less than two seconds greater than the processing time TimeVAProc.

Figure 6:
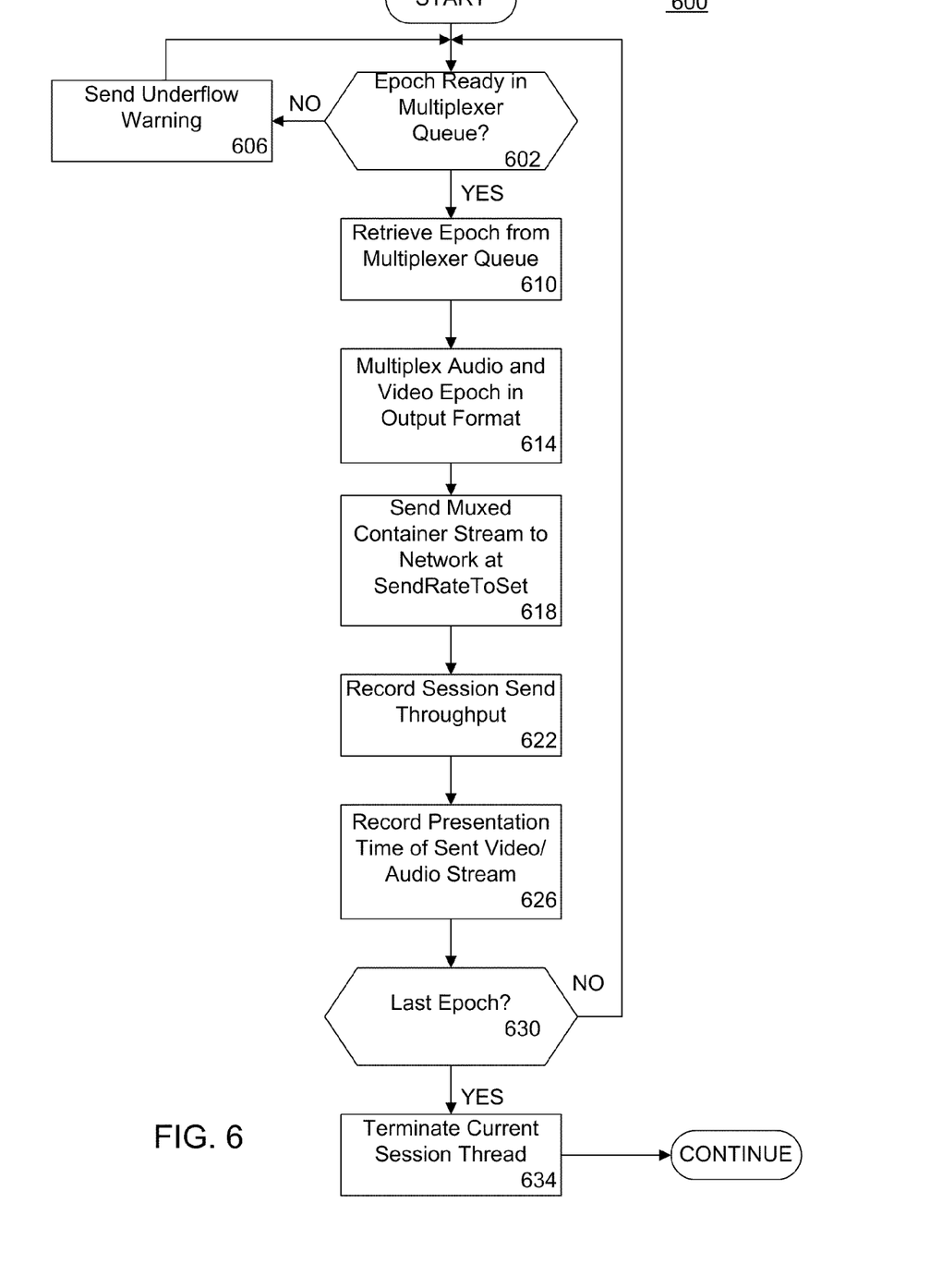
FIG. 6 is a flow diagram of more operations performed by subsystems of the APD server of FIG. 2.

FIG. 6 is a flow diagram of the operations performed by the Stream Multiplexer subsystem 228 of the APD server 212 of FIG. 2. Process 600 starts at box 602 with the stream multiplexer 228 determining if a video epoch is available in a multiplexer queue of the video interface 224. If a video epoch is not available, the stream multiplexer 228 sends an underflow warning to the APD controller 216 at box 606. If a video epoch is available, the stream multiplexer 228, at box 610, retrieves the available video epoch from the multiplexer queue of the video interface 224 and, at box 614, multiplexes it with a corresponding audio epoch that was stored in the audio FIFO 208. The audio and video epochs are formatted in one of the container formats such as Adobe FLV or Microsoft WMV. While multiplexing audio and video streams it is desirable to make sure that the audio and video streams for corresponding playback times are not too far away from each other in the container format, to ensure smooth and uninterrupted playback at the user computer.

At box 618, the formatted audio/video epoch is transferred to the output FIFO buffer 232 to be delivered to the router 108 and toward the subnetwork 114 by the delivery interface 236 at a rate determined by the value of SendRateToSet that was determined using the process 500 discussed above. At the stage 622, the delivery interface 236 records information representing the amount of data throughput resulting from delivering the current epoch. At box 626, the delivery interface 236 stores a record of the presentation time stamp of the delivered epoch. The information stored in the operations of boxes 622 and 626 is used, in one embodiment, in combination with the TCP write data received from the router 108, to calculate the network bandwidth available for delivery of the video content stream. In some embodiments, the CBE, predicted at box 518 of the process 500 of FIG. 5, is based on the presentation time recorded at box 626. At box 630, it is determined if this is the last epoch in the thread. If it is the last epoch, the current session thread is terminated at box 634. If it is not the last epoch, the operations represented by the boxes 602, 606, 610, 614, 618, 622, and 626 continue while video epochs are available for delivery.

In one embodiment, a computer system (such as an APD server 112 of FIG. 1) to perform methods as described herein. According to a set of embodiments, some or all of the procedures of such methods are performed by the computer system 112 in response to processor of the system executing one or more sequences of one or more instructions (which might be incorporated into the operating system and/or other code of the computer system, such as an application program) contained in working memory of the computer system. Such instructions may be read into the working memory from a machine-readable medium, such as one or more storage devices. Merely by way of example, execution of the sequences of instructions contained in the working memory might cause the APD controller 216 to perform one or more procedures of the methods described herein.

The terms "machine readable medium" and "computer readable medium," as used herein, refer to any medium that participates in providing data that causes a machine to operate in a specific fashion. In an embodiment implemented using the computer system 112, various machine-readable media might be involved in providing instructions/code to processors for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as storage devices. Volatile media includes, without limitation, dynamic memory, such as the working memory. Transmission media includes coaxial cables, copper wire, and fiber optics, including the wires that comprise a system bus of the computer 112, as well as various components of subsystems such as a communications subsystem or network delivery interface (and/or the media by which the communications subsystem provides communication with other devices).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read instructions and/or code.

Various forms of machine-readable media may be involved in carrying one or more sequences of one or more instructions to the computer processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 112. These signals, which might be in the form of electromagnetic signals, acoustic signals, optical signals, and/or the like, are all examples of carrier waves on which instructions can be encoded, in accordance with various embodiments of the invention.

The present invention has been described above in terms of presently preferred embodiments so that an understanding of the present invention can be conveyed. There are, however, many configurations of systems for managing the delivery of progressively downloaded video data not specifically described herein but with which the present invention is applicable. The present invention should therefore not be seen as limited to the particular embodiments described herein, but rather, it should be understood that the present invention has wide applicability with respect to video data delivery systems generally. All modifications, variations, or equivalent arrangements and implementations that are within the scope of the attached claims should therefore be considered within the scope of the invention.

We claim:

1. A method of streaming data over a network, the method comprising:
   at an adaptive progressive server which streams content to a user playback equipment, dividing data packets of an intercepted content stream into epochs of contiguous data such that content of each epoch can be independently transrated for transfer over a network as part of a temporally ordered content stream, the epochs including a current epoch;
   at the adaptive progressive server which streams content to the user playback equipment, determining a bit rate available on the network for transferring the current epoch from the adaptive progressive server to the user playback equipment;
   at the adaptive progressive server which streams content to the user playback equipment, estimating a temporal amount of the content stream that is buffered at the user playback equipment to which the content stream is being transferred, wherein the estimating is based at least in part on (a) the bit rate available on the network, as determined by the adaptive progressive server, and (b) an encoding bit rate of the intercepted content stream, as determined by the adaptive progressive server; and
   at the adaptive progressive server which streams content to the user playback equipment, controlling the transfer of the content stream over the network in accordance with the temporal amount of buffered content stream estimated by the adaptive progressive server, and transrating in real time one or more epochs from a first bitrate to a second, lower, bitrate to reduce an average video bitrate to a level suitable for transport with current network conditions.

2. The method of claim 1, wherein the epochs comprise data packets encapsulated in a container wrapper format for network transfer, wherein the method comprises: at the adaptive progressive server which streams content to the user playback equipment, dividing the content stream into epochs such that each epoch corresponds to approximately five to seven seconds of audio/video content.

3. The method of claim 1, comprising:
   at the adaptive progressive server which streams content to the user playback equipment, estimating that the temporal amount of the content stream that is buffered at the user playback equipment is below a lower threshold,
   at the adaptive progressive server which streams content to the user playback equipment, determining a bit rate at which to re-encode in real time the current epoch to maintain the temporal amount of the content stream that is buffered at the user playback equipment above the lower threshold; and
   transferring the current epoch, over the network towards the user playback equipment;
   wherein estimating the temporal amount of the content stream that is buffered at the user playback equipment comprises: at the adaptive progressive server that streams content to the user playback equipment, (A) tracking a duration, in seconds of viewing time, of the epochs that were delivered to the user playback equipment via a delivery interface; (B) tracking an average video rate of the epochs; (C) tracking an estimated network bandwidth being utilized to transport the content stream; (D) tracking previous estimates of the temporal amount of content buffered at the user playback equipment based on timestamps of multiplexed audio/video being sent over the network.

4. The method of claim 3, comprising:
   at the adaptive progressive server that streams content to the user playback equipment, increasing the transfer rate of the real time re-encoded current epoch into a container wrapper for transfer over the network toward the user playback equipment to increase playback time of content stream, buffered at the user playback equipment, above the lower threshold.

5. The method of claim 1, comprising:
   at the adaptive progressive server that streams content to the user playback equipment, estimating that the temporal amount of buffered content stream is above an upper threshold, and
   at the adaptive progressive server that streams content to the user playback equipment, slowing the transfer of the current epoch over the network to maintain playback time of content stream, buffered at the user playback equipment, below the upper threshold.

6. A method of streaming data over a network, the method comprising:
   at a Deep Packet Inspection (DPI) router that routes packets of audio/video content to a user playback equipment, intercepting data packets being transferred over the network, identifying that the data packets are part of a temporally ordered content stream, and forwarding the temporally ordered content stream to a demultiplexing subsystem of an adaptive progressive server;
   at said adaptive progressive server that routes packets of audio/video content to the user playback equipment, dividing the intercepted data packets of the content stream into epochs of contiguous data, the epochs including a current epoch, wherein the dividing comprises dividing the intercepted data packets into epochs such that each epoch corresponds to approximately five to seven seconds of audio/video content;
   at said adaptive progressive server that routes packets of audio/video content to the user playback equipment, determining a bit rate available on the network for transferring the current epoch;
   at said adaptive progressive server that routes packets of audio/video content to the user playback equipment, estimating a temporal amount of the content stream that is buffered at the user playback equipment to which the content stream is being transferred,
   wherein the estimating at said adaptive progressive server is based at least in part on cal the bit rate available on the network, as determined by the adaptive progressive server, and (b) an encoding bit rate of the content stream, as determined by the adaptive progressive server; and
   at said adaptive progressive server, estimating that the temporal amount of the content stream that is buffered at the user playback equipment is above a threshold, and slowing transfer of the current epoch over the network toward said user playback equipment.

7. The method of claim 6, comprising:
   at the adaptive progressive server, dividing the intercepted data packets into audio content epochs and video content epochs, and multiplexing in real time the audio and video content epochs into a contiguous data stream with a container wrapper format configured to be transferred over the network toward said user playback equipment.

8. A system for streaming data over a network, the system comprising:
   a controller connected between a hosting web server that hosts audio/video content and a user playback equipment, wherein the controller
   (A) divides data packets of an intercepted content stream into epochs of contiguous data such that content of each epoch can be independently transrated for transfer over a network as part of a temporally ordered content stream, the epochs including a current epoch,
   (B) determines a bit rate available on the network for transferring the current epoch from said controller to the user playback equipment, and
   (C) estimates a temporal amount of the content stream that is buffered at the user playback equipment to which the content stream is being transferred, by taking into account at least (a) the bit rate available on the network, as determined by said controller, and (b) an encoding bit rate of the intercepted content stream, as determined by said controller;
   and
   a delivery interface that (i) controls the transfer of the intercepted content stream over the network toward the user playback equipment in accordance with the playback time estimated by the controller, and (ii) trans-rates in real time one or more epochs from a first bitrate to a second, lower, bitrate to reduce an average video bitrate to a level suitable for transport with current network conditions.

9. The system of claim 8, wherein the epochs comprise data packets that are encapsulated in a container wrapper format for network transfer.

10. The system of claim 8, wherein, if the calculated estimate of the playback time is below a lower threshold, the controller:
    determines a bit rate at which to re-encode the current epoch to maintain the playback time of the buffered content stream above the lower threshold; and
    transfers the re-encoded current epoch over the network toward the user playback equipment.

11. The system of claim 10, wherein the controller is to increase the transfer of the re-encoded current epoch into a container wrapper format for transfer over the network to increase the playback time of the buffered content stream above the lower threshold.

12. The system of claim 8, wherein, if the calculated estimate of the playback time is above an upper threshold, the delivery interface slows the transfer of the current epoch over the network to maintain the playback time of the buffered content stream below the upper threshold.

13. A system for streaming data over a network, the system comprising:
    a controller connected between a hosting web server that hosts audio/video content and a user playback equipment, wherein the controller
    (A) intercepts data packets being transferred over a network from said hosting web server to said user playback equipment,
    (B) identifies the intercepted data packets as being part of at least one temporally ordered content stream,
    (C) divides the data packets of the content stream into epochs of contiguous data, the epochs including a current epoch,
    (D) determines a bit rate available on the network for transferring the current epoch from said controller to the user playback equipment, and
    (E) estimates a temporal amount of the content stream that is buffered at the user playback equipment to which the content stream is being transferred, by taking into account at least (a) the bit rate available on the network, as estimated by said controller, and (b) a video bit rate at which the epoch is encoded, as determined by said controller;
    and
    a delivery interface that slows the transfer of the current epoch over the network toward the user playback equipment if the calculated estimate is above a threshold.

14. The system of claim 13, wherein the controller is to divide the intercepted data packets into audio content epochs and video content epochs, and to multiplex the audio content epochs and the video content epochs into a contiguous data stream with a container wrapper format configured to be transferred over the network toward said user playback equipment.

15. A computer-readable memory having a computer-readable program embodied therein for directing operation of a computer system for streaming data over a network, the computer-readable program including computer executable instructions for processing in accordance with the following:
    at an adaptive progressive server which streams content to a user playback equipment, dividing data packets of an intercepted content stream into epochs of contiguous data such that content of each epoch can be independently transrated for transfer over a network as part of a temporally ordered content stream, the epochs including a current epoch;

at the adaptive progressive server which streams content to the user playback equipment, determining a bit rate available on the network for transferring the current epoch from the adaptive progressive server to the user playback equipment;

at the adaptive progressive server which streams content to the user playback equipment, estimating a temporal amount of the content stream that is buffered at the user playback equipment to which the content stream is being transferred, wherein the estimating is based at least in part on (a) the bit rate available on the network, as determined by the adaptive progressive server, and (b) an encoding bit rate of the intercepted content stream, as determined by the adaptive progressive server; and at the adaptive progressive server which streams content to the user playback equipment, controlling the transfer of the content stream over the network toward the user playback equipment in accordance with the playback time estimated by the adaptive progressive server, and trans-rating in real time one or more epochs from a first bitrate to a second, lower, bitrate.

16. The computer-readable memory of claim 15, wherein the epochs comprise data packets that are encapsulated in a container wrapper format for network transfer.

17. The computer-readable memory of claim 15, wherein, if the calculated estimate of the playback time is below a lower threshold, the controlling comprises:

determining a bit rate at which to re-encode the current epoch to maintain the playback time of the buffered content stream above the lower threshold; and transferring the re-encoded current epoch toward the network.

18. The computer-readable memory of claim 17, wherein the controlling comprises increasing the transfer rate of the re-encoded current epoch for transfer over the network to increase the playback time of the buffered content stream above the lower threshold.

19. The computer-readable memory of claim 15, wherein, if the calculated estimate of the playback time is above an upper threshold, the controlling comprises slowing the transfer of the current epoch over the network to maintain the playback time of the buffered content stream below the upper threshold.

20. A computer-readable memory having a computer-readable program embodied therein for directing operation of a computer system for streaming data over a network, the computer-readable program including computer executable instructions for processing in accordance with the following:

at a Deep Packet Inspection (DPI) router that routes packets of audio/video content to a user playback equipment, intercepting data packets being transferred over the network, identifying that the data packets are part of a temporally ordered content stream, and forwarding the temporally ordered content stream to a demultiplexing subsystem of an adaptive progressive server;

at said adaptive progressive server that routes packets of audio/video content to the user playback equipment, dividing the intercepted data packets of the content stream into epochs of contiguous data, the epochs including a current epoch, wherein the dividing comprises dividing the intercepted data packets into epochs such that each epoch corresponds to approximately five to seven seconds of audio/video content;

at said adaptive progressive server that routes packets of audio/video content to the user playback equipment, determining a bit rate available on the network for transferring the current epoch;

at said adaptive progressive server that routes packets of audio/video content to the user playback equipment, estimating a temporal amount of the content stream that is buffered at the user playback equipment to which the content stream is being transferred, wherein the estimating at said adaptive progressive server is based at least in part on (a) the bit rate available on the network, as determined by the adaptive progressive server, and (b) an encoding bit rate of the content stream, as determined by the adaptive progressive server; and at said adaptive progressive server, estimating that the temporal amount of the content stream that is buffered at the user playback equipment is above a threshold, and slowing transfer of the current epoch over the network toward said user playback equipment.

* * * * *